United States Patent [19]

DeFrees

[11] 4,406,299

[45] Sep. 27, 1983

[54] LIQUID LEVEL VALVE

[75] Inventor: Joseph H. DeFrees, Warren, Pa.

[73] Assignee: Barbara Baldwin DeFrees, Warren, Pa.

[21] Appl. No.: 255,864

[22] Filed: Apr. 20, 1981

Related U.S. Application Data

[62] Division of Ser. No. 1,002, Jan. 4, 1979, Pat. No. 4,316,484.

[51] Int. Cl.³ .................. F16K 17/40; F16K 31/143; F16K 31/145
[52] U.S. Cl. ....................................... 137/71; 137/75; 137/389; 137/390; 141/113; 141/198; 251/28
[58] Field of Search ............... 137/389, 386, 390, 414, 137/426, 393, 403, 68 R, 71, 73, 75; 141/192, 198, 225, 226, 113; 251/28, 45, 46, 144

[56] References Cited

U.S. PATENT DOCUMENTS

| 2,004,715 | 6/1935 | Thwaits | 137/75 |
| 2,600,977 | 6/1952 | DeFrees | 137/75 |
| 3,029,833 | 4/1962 | DeFrees | 137/414 |
| 3,047,009 | 7/1962 | Hunter | 137/403 |
| 3,115,894 | 12/1963 | Marx | 137/73 |
| 3,251,375 | 5/1966 | Reed et al. | 137/414 |
| 3,404,703 | 10/1968 | Marx | 137/391 |
| 4,009,862 | 3/1977 | DeFrees | 251/144 |

Primary Examiner—George L. Walton
Attorney, Agent, or Firm—Baldwin, Egan, Walling, & Fetzer

[57] ABSTRACT

A liquid level valve for use in filling a liquid storage tank to control (in response to increased air pressure within the liquid level valve) the tank emergency loading valve which is held open by pressurized air.

The liquid level valve has an air control cavity connected to the pressurized air and an actuating cavity which exhausts to the atmosphere and is disposed above the air control cavity and connected to it via an actuating passageway. An air control diaphragm divides the air control cavity into upper and lower portions and controls the flow of pressurized air into such lower portion which exhausts to the atmosphere. The air control diaphragm has a small air control passageway (of smaller diameter than the actuating passageway) allowing pressurized air into the air control cavity upper portion, thus permitting the pressurized air to act on both sides of the air control diaphragm. An actuating diaphragm, responsive to increased pressure within the liquid level valve, controls the flow of pressurized air through the actuating passageway.

In a tank filling operation, as the tank liquid lading rises to a predetermined level, the air pressure within the liquid level valve rises and causes the actuating diaphragm to permit the flow of pressurized air through the actuating passageway and then to the atmosphere whereby pressurized air is discharged from the air control cavity upper portion and the air control diaphragm rises and permits the pressurized air to enter the air control cavity lower portion and exhaust to the atmosphere thus closing the emergency valve.

4 Claims, 11 Drawing Figures

LIQUID LEVEL VALVE

This is a division, of application Ser. No. 1,002, filed Jan. 4, 1979, now U.S. Pat. No. 4,316,484.

This invention relates to liquid level valves for controlling the emergency loading valve in liquid storage tanks, and more specifically to a liquid level valve responsive to air pressure within the valve caused by a difference in liquid lading head outside the valve and inside the valve on the tank loading.

BACKGROUND OF THE INVENTION

Because of cost reduction and added safety, bottom loading has been used for many years on highway transportation tanks. At first, the cut-off controls were directed to cutting off the flow when the liquid level in the tank reached a predetermined level. Volume measuring devices were commonly used, but no satisfactory system evolved.

The laws requiring the recovery of vapors have given impetus to bottom loading, but now most terminals load by preset meters. There still remains the chance, (1) that the meter could be incorrectly set, (2) the compartments would not be completely drained, or (3) connections would be mis-mated. Any one of these three conditions could result in spills. To guard against this, an override system actuated by the liquid level is mandatory.

Many override systems have been devised, including float switches, float valves, fiber optics, thermistors, electric eyes, liquid jets and many more. Some tanks carry two systems in order to be loaded at different terminals.

Most systems are expensive and many require electrical connections to the bulk plant. Few are interchangeable. Also, many of them are wrecked by vibration, particularly the float valves.

SUMMARY OF THE INVENTION

Accordingly, an object of the invention is to provide a liquid level responsive valve for controlling a liquid storage tank emergency valve that is simple in construction, inexpensive to manufacture, and highly effective in operation.

A further object of the invention is to provide a liquid level valve of the above type that is self-contained and does not require connections to the bulk plant except the normal product and vent lines.

A further object of the invention is to provide a liquid level valve of the above type that withstands road vibration.

A further object of the invention is to provide a liquid level valve of the above type constructed to prevent the tank liquid lading product from entering the valve.

A further object of the invention is to provide a liquid level valve of the above type that functions independently of any air pressure already in the tank.

A further object of the invention is to provide a liquid level valve and coacting tank emergency valve assembly that is an "on-board" system completely independent of the loading rack.

A further object of the invention is to provide a self-contained liquid level valve and coacting emergency tank loading valve system that is universal in nature and completely compatible to any bulk plant.

A further object of the invention is to provide a tank loading system of the above type having a "fail-safe" feature in case of accident, fire or emergency.

Briefly, the foregoing objects are accomplished by the provision of a liquid storage tank bottom loading system having a liquid level responsive valve for controlling the tank bottom loading emergency valve which is held open by auxiliary pressurized air. The liquid level valve is normally secured to the top wall of the tank interiorly thereof and is connected to the pressurized air line leading to the emergency valve, whereby as the liquid lading in the tank rises to a predetermined level, the liquid level valve, in response to increased air pressure within the liquid level valve caused by the rising level of liquid lading, releases or discharges the auxiliary pressurized air, thereby closing the emergency loading valve. Specifically, the liquid level valve includes a valve housing having an internal chamber open at the bottom. Disposed in the chamber is a valve body having an air control cavity, with an air control diaphragm horizontally positioned in the cavity to form a fluid barrier and divide it into an air control cavity upper portion and an air control cavity lower portion. The air control cavity lower portion is in fluid flow communication with the auxiliary pressurized air and in fluid flow communication with the atmosphere exteriorly of the liquid level valve. The valve body also has an air control valve seat defining an air control seat opening disposed between and connecting the air control cavity lower portion and the auxiliary pressurized air. The air control diaphragm is mounted for reciprocal movement toward and away from the air control valve seat selectively sealing the same to control the flow of auxiliary pressurized air through the air control opening. The air control diaphragm has an air control passageway connecting the air control seat opening with the air control cavity upper portion, whereby auxiliary pressurized air flows through the air control passageway from the seat opening and into the air control cavity upper portion to equalize the pressurized air on both sides of the air control diaphragm. Air control bias means in the form of a compressed coil spring is used for retaining the air control diaphragm in a normally closed position against the air control seat. The valve body also has an actuating cavity disposed above the air control cavity and in fluid flow communication with the atmosphere exteriorly of the liquid level valve. Additionally, the valve body has an actuating valve seat defining an actuating passageway of larger transverse size than the air control passageway and is disposed between and connects the actuating cavity and the air control cavity upper portion. An actuating disc is mounted for reciprocal movement toward and away from the actuating valve seat selectively sealing the same to control the flow of pressurized air through the actuating passageway. An actuating diaphragm, responsive to pressure within the liquid level valve, is mounted in the chamber for vertical reciprocation exteriorly of the valve body and is mounted to coactively control the actuating disc. An actuating bias means in the form of a compressed coil spring is used for retaining the actuating diaphragm and, in turn, the disc against the actuating valve seat in a normally closed position. The actuating diaphragm forms a horizontal fluid barrier dividing the chamber into a chamber upper section and a chamber lower section. The chamber upper section is vented to the atmosphere exteriorly of the liquid level valve, whereby as the level of liquid in the storage tank rises around the valve housing, atmospheric air pressure within the chamber lower section increases forcing the actuating diaphragm upward thereby lifting the actuating disc off the actuating valve seat in response to such increased interior atmospheric air pressure thereby exhausting auxiliary pressurized air from the air control cavity upper portion enabling the auxiliary pressurized air to act against the underside of the air control diaphragm only and lift the same off the air control seat permitting the auxiliary pressurized air to enter the air control cavity lower portion and thence flow to the atmosphere exteriorly of the liquid level valve to reduce the auxiliary pressurized air and close the emergency valve.

Other objects and advantages of the invention will be apparent from the following description taken in conjunction with the drawings wherein:

BRIEF DESCRIPTION OF THE DRAWINGS

In the drawings, like number and/or letters refer to like parts.

Figure 1:
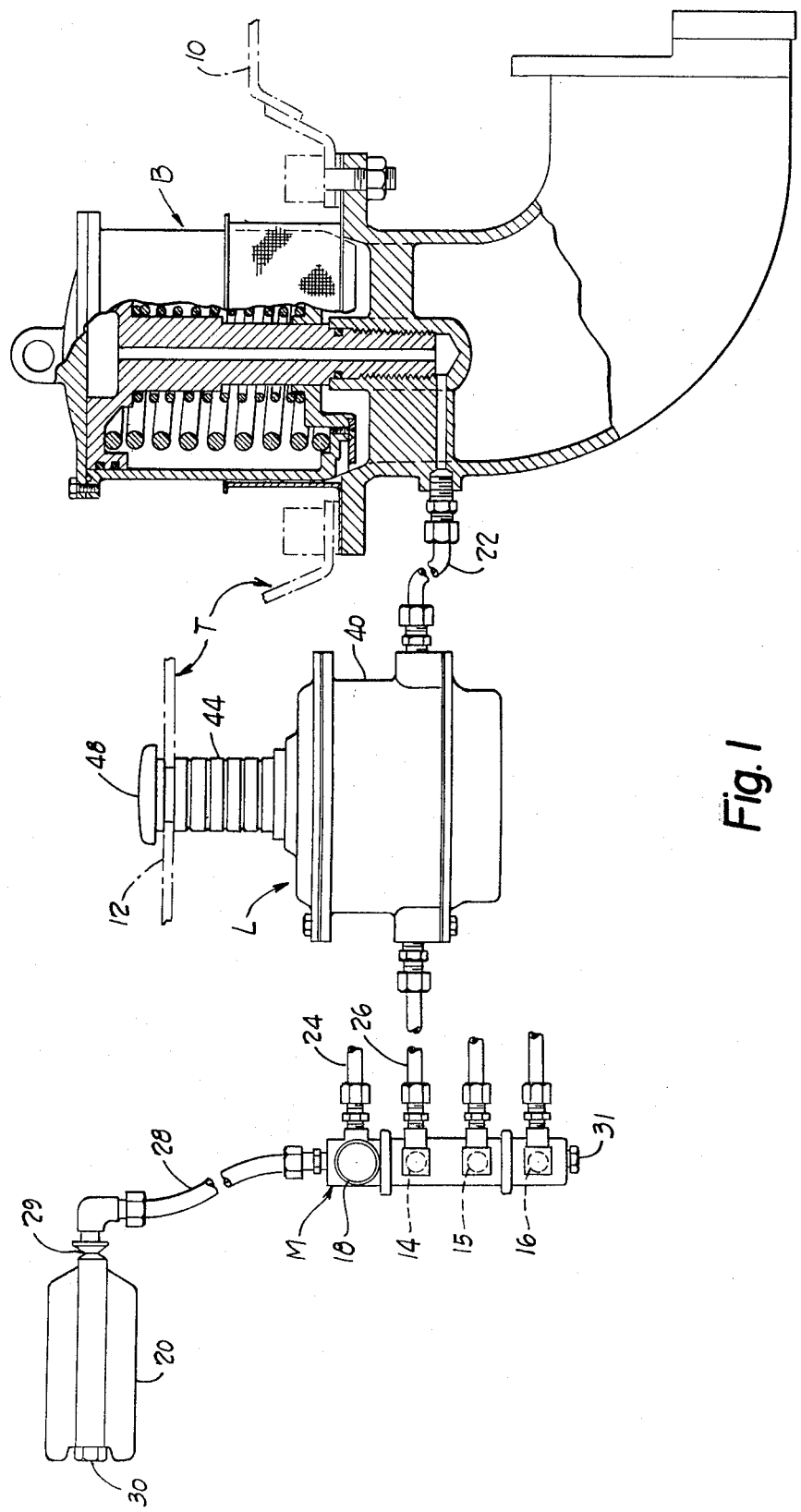
FIG. 1 is a schematic view, in front elevational outline with parts broken away, of a liquid storage tank bottom loading emergency valve and liquid level valve system constructed in accordance with the invention.

Referring first to FIG. 1, there is shown a schematic view of a liquid storage tank bottom loading system of the invention including the emergency bottom loading valve B disposed in the tank bottom wall 10 of the tank T, the liquid level valve L secured to the tank top wall 12, the manifold M including the three-way distributor valves 14, 15 and 16, the master control valve 18, and the remote control frangible plug 20. The emergency valve B is of known construction and is illustrated and described in the U.S. Pat. No. 4,009,862 to Joseph H. DeFrees dated Mar. 1, 1977. For present purposes, the emergency valve B is held open by auxiliary pressurized air from the pipe 22. Exhausting of such pressurized air by the liquid level valve L (in response to a rise in liquid lading level around the valve L) closes the valve B stopping bottom loading, for example, of the tank T as will be hereinafter described in detail. Pressurized air from a suitable source (not shown) enters the system through the line 24 thence into the manifold M. Flow of pressurized air through the manifold is controlled by the manually operated master control valve 18, the operating handle of which is biased to a normally closed position. In the manifold, pressurized air flows from the master control valve 18 through the distributor valve 14 to the pipe 26, thence into the liquid level valve L, thence into the emergency bottom loading valve B via the pipe 22 as aforedescribed.

In practice, the operator first opens the correct distributor valve 14, 15 or 16 (in FIG. 1 it would be distributor valve 14), after which the (normally closed) handle of the master control valve 18 is manually held in open position for approximately three to five seconds allowing pressurized air to enter the valves L and B, after which the master control valve handle is released. This traps pressurized air that holds the emergency valve B in open position and acts on the liquid level valve L to retain it in a closed position preventing exhausting of pressurized air from the system until the tank liquid lading level rises around the valve L as will be hereinafter explained.

The system is provided with the frangible plug 20 suitably located on the tank truck at a location remote from the point of fill or discharge (preferably at the front curb side of the tank trailer) and is connected to the manifold via the pressurized air line or tubing 28. The plug 20 has a restricted or break-away portion 29 enabling the operator to quickly and easily break off the plug and thus fracture the line 28, thereby exhausting the pressurized air to shut off or close the bottom loading valve B in case of emergency. Heat sensitive fusible plugs 30 and 31 are also disposed in the frangible plug and manifold, respectively, to provide exhausting of the pressurized air in case of fire. The present invention is directed to the liquid level valve L which exhausts the pressurized air in response to the tank liquid lading reaching a predetermined level around the valve L, thereby shutting off the bottom loading valve B as will be described. The liquid level control valve L plays no part in the operation of the emergency valve B unless the liquid lading level in the tank T rises around the liquid level valve L.

Figure 2:
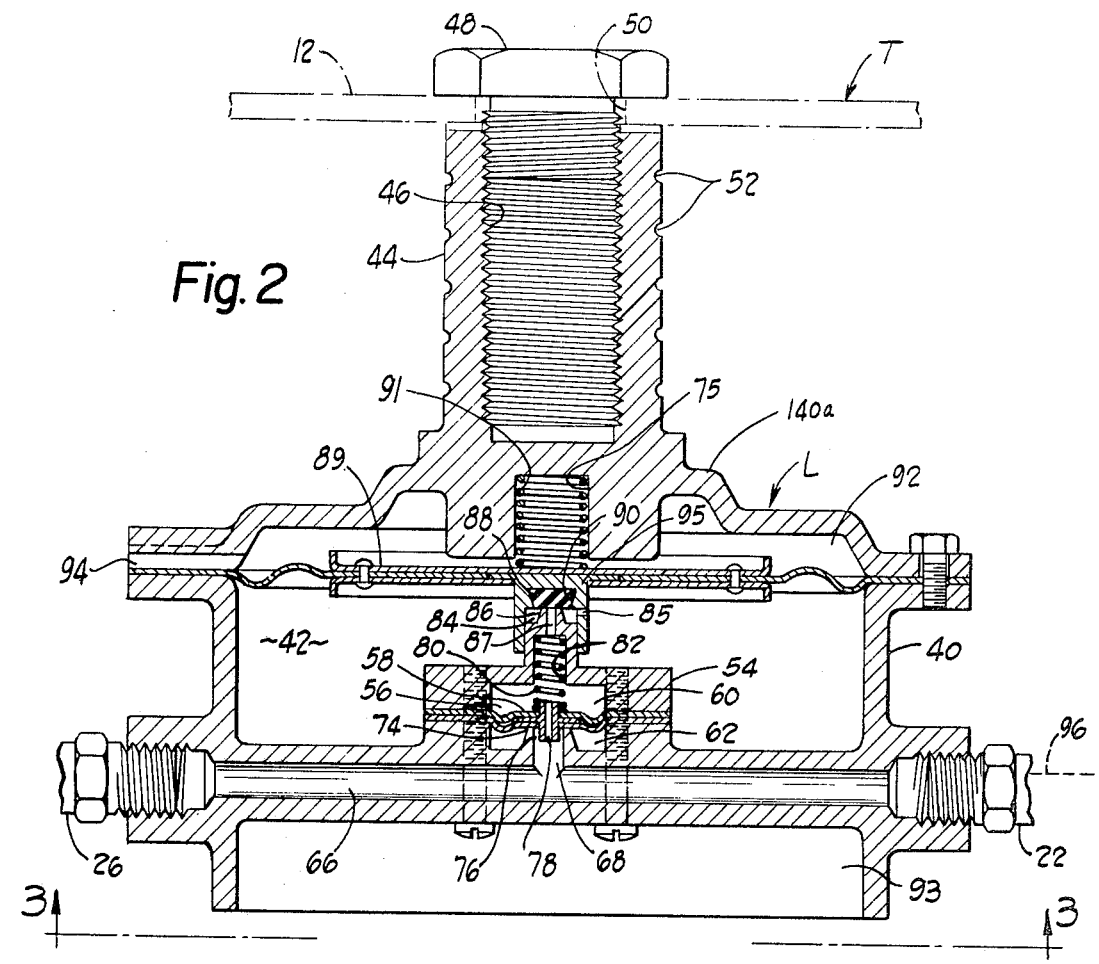
FIG. 2 is a front elevational sectional view of the liquid level valve shown in FIG. 1.
Figure 3:
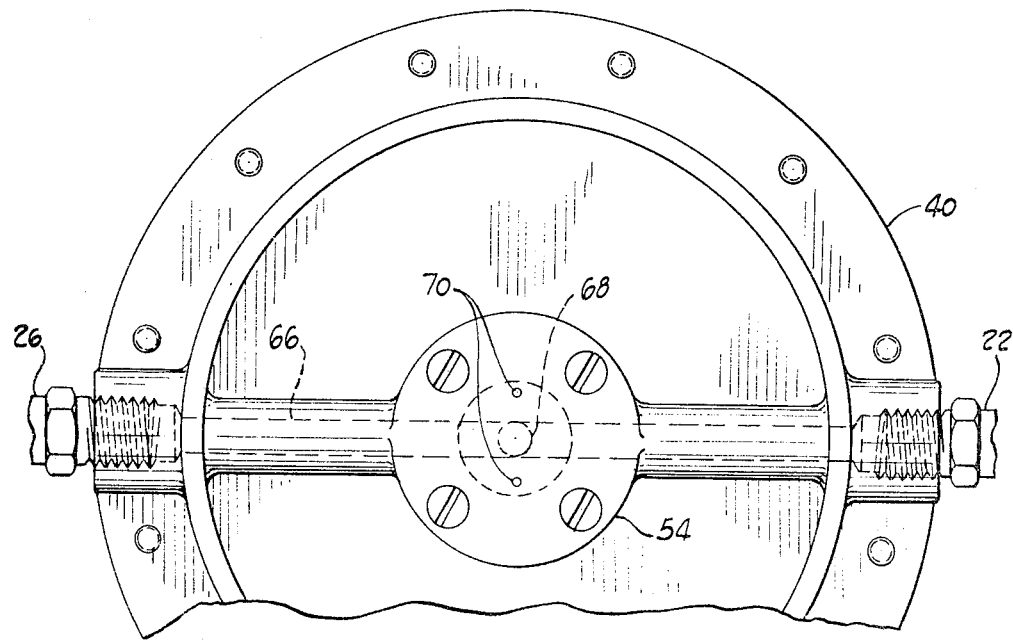
FIG. 3 is a portional view taken along the line 3—3 of FIG. 2.

Referring to FIGS. 2 and 3, the liquid level valve L includes a valve housing 40 having an internal chamber 42 open at the bottom. The housing 40 has an upwardly extending neck portion 44 having an internal threaded bore 46 for receiving the threaded plug 48 through the tank top wall aperture 50 to secure the valve L to the top wall 12 of the tank. The neck 44 has spaced parallel cuts or annular serrations 52 circumferentially formed in its outer surface forming cutting guides enabling easy transverse cutting of the neck portion to preselected length to provide liquid level valve actuation at a preselected tank liquid lading level.

Disposed in the chamber 42 is a valve body 54 having an air control cavity 56, with an air control diaphragm 58 held by the body 54 and horizontally and reciprocably positioned in the cavity 56 to form a fluid barrier and divide it into an air control cavity upper portion 60 and an air control cavity lower portion 62.

Auxiliary pressurized air enters the valve L through the pipe 26, then flows through the pressurized air passageway 66 and out the pipe 22 to the emergency valve B. Intermediate the ends of the passageway 66 is an upwardly extending air control passageway 68 connecting the air control cavity lower portion 62 with the pressurized air (when the diaphragm 58 is in its upper position as will be explained). The air control cavity lower portion 62 is also connected to the atmosphere exteriorly of the valve L through the air control exhaust passageway or ports 70 (FIG. 3).

The valve body 54 also has an air control valve seat 74 defining an air control seat opening 76 disposed between and connecting the air control cavity lower portion 62 and the auxiliary pressurized air. The air control diaphragm 58 is mounted for controlled reciprocal movement toward and away from the air control valve seat 74 selectively sealing the same to control the flow of auxiliary pressurized air through the air control seat opening 76. The air control diaphragm 58 has an air control passageway 78 connecting the air control seat opening 76 with the air control cavity upper portion 60, whereby auxiliary pressurized air flows through the air control passageway 78 from the seat opening 76 (and the passageway 68) and into the air control cavity upper portion 60 to equalize the pressurized air on both sides of the air control diaphragm 58. Air control bias means in the form of a compressed coil spring 80 (contained in the bore 82 and acting against the diaphragm 58) is used for retaining the air control diaphragm 58 in a normally closed position against the air control seat 74. Thus, the air control cavity lower portion 62 is in fluid-flow communication with the auxiliary pressurized air (when the diaphragm 58 is lifted from the seat 74 as will be hereinafter explained) and in fluid flow communication with the atmosphere exteriorly of the liquid level valve through the air control exhaust passageways 70.

The valve body 54 also has an actuating cavity 84 disposed above the air control cavity 56 and in fluid flow communication with the atmosphere exteriorly of the liquid level valve through the actuating exhaust passageway 85 thence into the chamber 42. Additionally, the valve body 54 has an actuating valve seat 86 defining an actuating passageway 87 of larger transverse size than the air control passageway 78 and is disposed between and connects the actuating cavity 84 and the air control cavity upper portion 60. An actuating disc 88 is mounted for reciprocal movement toward and away from the actuating valve seat 86 selectively sealing the same to control the flow of pressurized air through the actuating passageway 87. A planar actuating diaphragm 89, held by the housing 40, and responsive to tank internal atmospheric pressure, is mounted in the chamber 42 for vertical reciprocation exteriorly of the valve body 54 and is mounted to coactively control the actuating disc 88. Specifically, the diaphragm 89 carries a hat section 95 having a recess 90 in which the disc 88 is positioned. An actuating bias means in the form of a compressed coil spring 91 (disposed in the housing bore 75) is used for retaining the actuating diaphragm 89 and in turn, the disc 88 against the actuating valve seat 86 in a normally closed position.

The actuating diaphragm 89 forms a horizontal fluid barrier dividing the chamber 42 into a chamber upper section 92 and a chamber lower section 93. The chamber upper section 92 is vented to the atmosphere exteriorly of the liquid level valve through the exhaust orifice 94.

In operation, as the level of liquid lading in the storage tank T rises around the valve housing 40, atmospheric air pressure within the chamber lower section 93 increases forcing the actuating diaphragm 89 upward, thereby lifting the actuating disc 88 off the actuating valve seat 86 in response to such increased interior atmospheric air pressure, thereby exhausting auxiliary pressurized air from the air control cavity upper portion 60. Such exhausting enables the auxiliary pressurized air to act against the underside of the air control diaphragm 58 only and lift the same off the air control seat 74 permitting the auxiliary pressurized air to enter the air control cavity lower portion 62 and thence flow to the atmosphere exteriorly of the liquid level valve out the passageways 70 to exhaust the auxiliary pressurized air and close the emergency valve B.

Thus, the liquid level valve L functions on trapped pressurized air in that pressurized air is initially trapped in passageway 66, actuating passageway 68, air control passageway 78, the air control cavity upper portion 60 and actuating passageway 87. When the valve housing 40 becomes partially submerged in liquid lading generally to about the level 96 (FIG. 2), the atmospheric air pressure interiorly of the valve L increases and such increased air pressure is exerted on the assembly including the actuating diaphragm 89, hat section 95, and the actuating disc 88 causing it to move upward against the action of compressed coil spring 91. The disc 88 then becomes disengaged from the actuating valve seat 86 and pressurized air coming up through the actuating passageway 87 is discharged through the actuating exhaust passageway 85 to the chamber 42, to the interior of the tank T. Because actuating passageway 87 and actuating exhaust passageway 85 are larger than air control passageway 78, air pressure in air control cavity upper portion 60 falls, thus permitting air control diaphragm 58 to become disengaged from air control valve seat 74 (since air pressure is now greater on the bottom side of diaphragm 58 than on the top side thereof) and pressurized air coming up through actuating passageway 68 (and passageway 66) is now exhausted through air control cavity lower portion 62 and out the air control exhaust ports 70 thus closing the emergency valve B.

It is to be understood that the liquid level valve initially functions on trapped pressurized air as aforedescribed. This enables almost immediate starting of discharge on an overfill. In most other systems after an overfill or spill, the product must be removed from the tank T by a syphon or by bucketing to again make the system operatable. With the present system, if there is an overfill, discharge can be started again almost at once by opening the master control valve 18 and the distributor valve 14. By sizing exhaust passageway 70 properly, air can be admitted to the system faster than it is exhausted and pressure in the system will rise sufficiently to open the emergency valve B. Discharge liquid flow is then commenced and valve B is held open or until tank liquid level drops below the liquid level control valve L and exhaust flow of pressurized air stops, thus permitting a buildup and trapping of sufficient pressurized air to keep emergency valve B in open position.

The two spring loaded diaphragms (i.e. valves) 89 and 58 act as check valves to prevent the liquid product from entering the pressurized air system.

Figure 4:
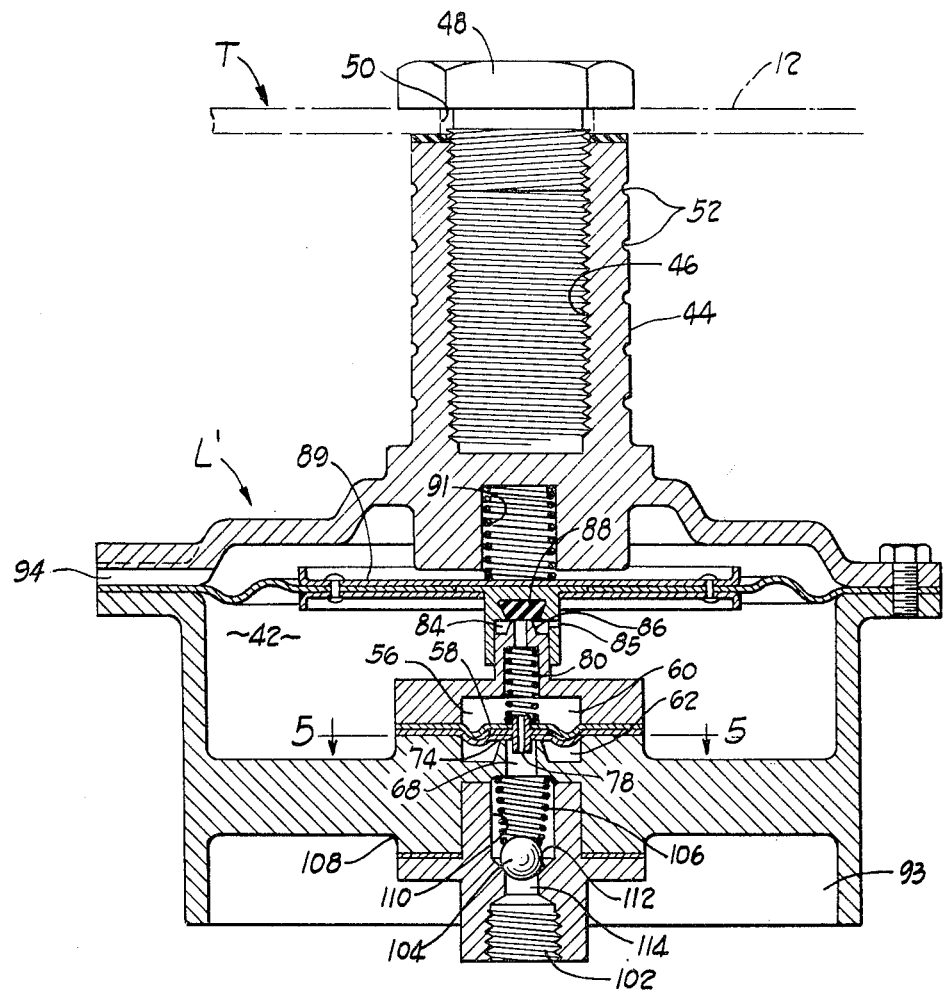
FIG. 4 is a view similar to FIG. 2, but showing a modification thereof.
Figure 5:
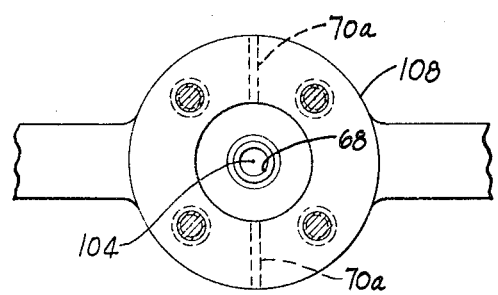
FIG. 5 is a view taken along the line 5—5 of FIG. 4.

The structure and function of the liquid level valve L' shown in FIGS. 4 and 5 is similar to that of FIG. 2 except that a single pressurized air connection 102 is employed (thereby eliminating two air connections) and a coacting check valve has been added including the thermoplastic ball 104 and coacting spring 106. Also the air control exhaust ports 70 of FIG. 3 have been relocated and identified as 70a in FIG. 5. Specifically, the valve body 108 (FIG. 4) has a bore 110 containing the compressed coil spring 106 which forces the ball 104 against the bore restricted portion 112 in a normally closed position to close the check valve pressurized air incoming passageway 114. This structure forestalls the possibility of liquid lading product entering the air system, should surge pressures act on diaphragm 89 even though it is biased by spring 91.

Figure 6:
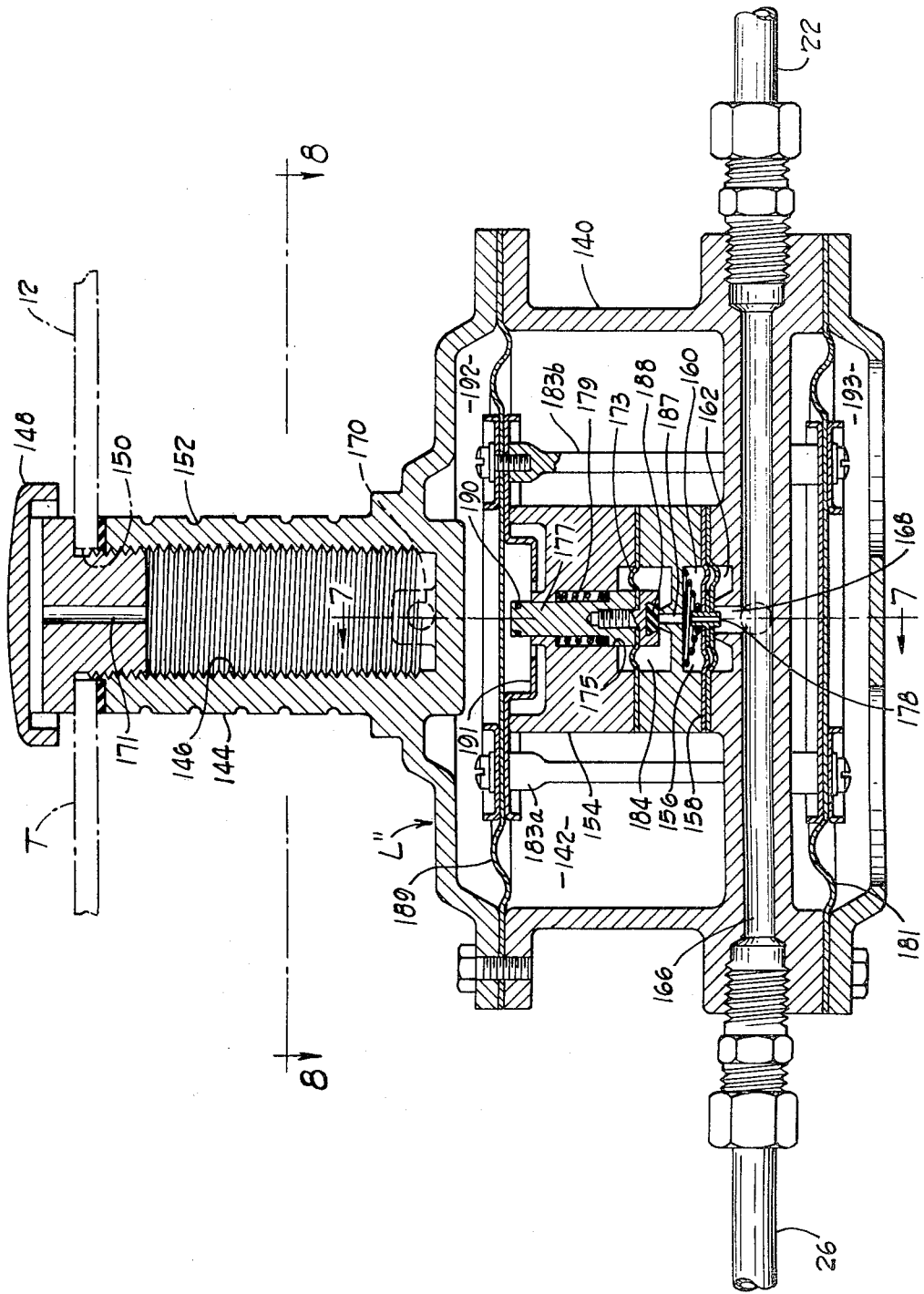
FIG. 6 is a view similar to FIG. 2, but showing a further modification thereof.
Figure 7:
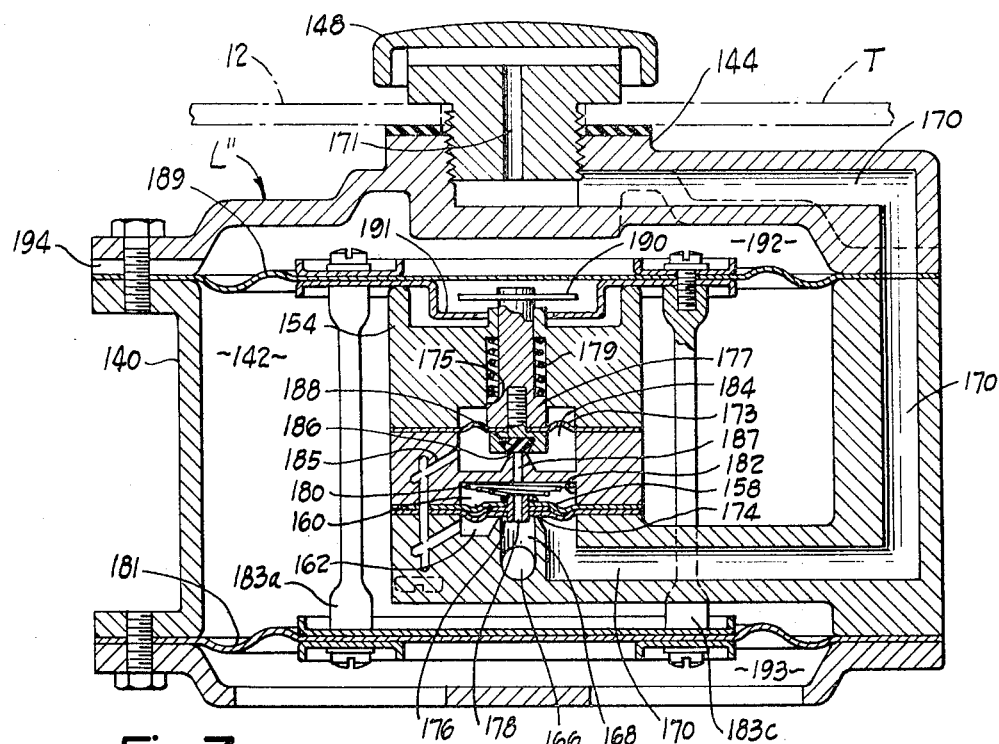
FIG. 7 is a view taken along the line 7—7 of FIG. 6, but showing a shortened neck.
Figure 8:
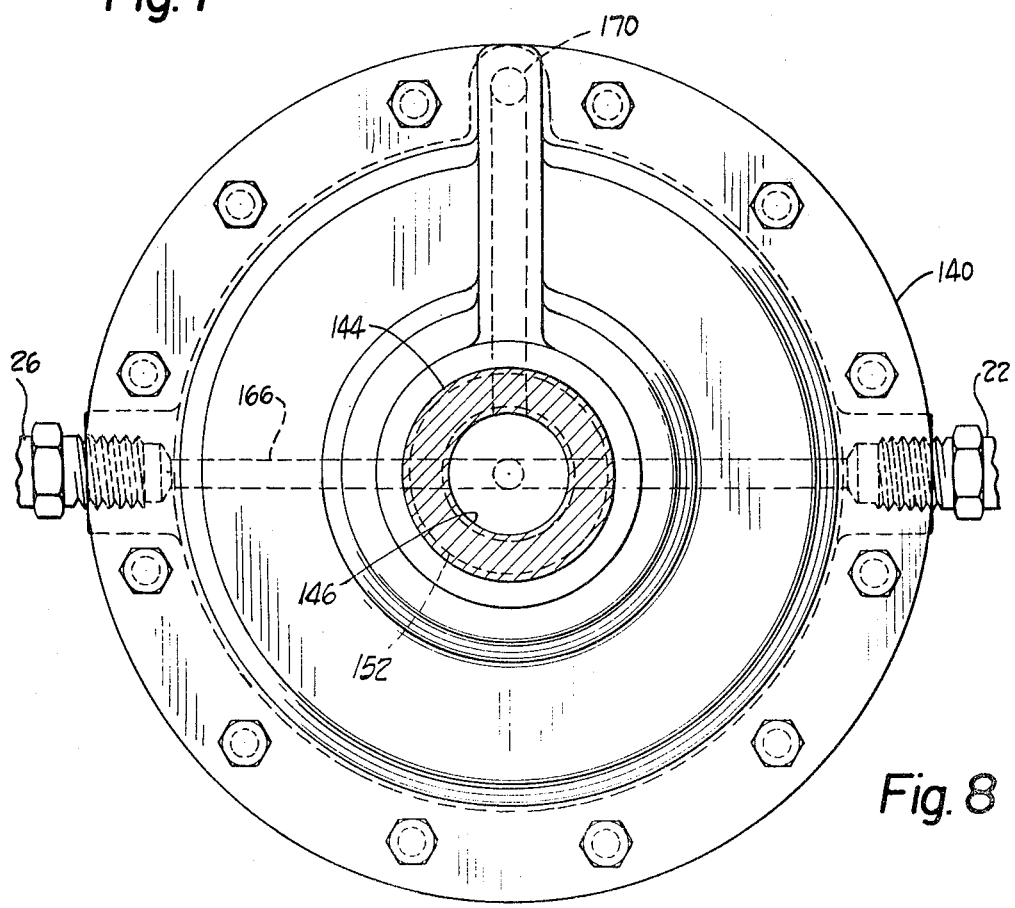
FIG. 8 is a view taken along the line 8—8 of FIG. 6 with portions broken away.

Referring now to the modification shown in FIGS. 6, 7 and 8, the liquid level valve L" includes a valve housing 140 having an internal chamber 142 open at the bottom. The housing 140 has an upwardly extending neck portion 144 (FIG. 6) having an internal threaded bore 146 for receiving the threaded plug 148 through the tank top wall aperture 150 to secure the valve L" to the top wall 12 of the tank. The neck 144 has spaced parallel cuts or annular serrations 152 circumferentially formed in its outer surface forming cutting guides enabling easy transverse cutting of such neck portion to preselected length to provide liquid level valve actuation at a preselected tank liquid lading level. As illustrated in FIG. 7 for example, the neck portion 144 has been almost totally cut off to allow the valve L" to be placed higher in the tank T enabling a higher fill of liquid lading in the tank.

Disposed in chamber 142 is a valve body 154 having an air control cavity 156 (FIG. 6), with an air control diaphragm 158 horizontally and reciprocably positioned in the cavity 156 to form a fluid barrier and divide it into an air control cavity upper portion 160 (FIG. 7) and an air control cavity lower portion 162.

Auxiliary pressurized air enters the valve L" through the pipe 26 (FIG. 6), then flows through the pressurized air passageway 166 and out the pipe 22 to the emergency valve B. Intermediate the ends of the passageway 166 is an upwardly extending air control passageway 168 connecting the air control cavity lower portion 162 with the pressurized air. The air control cavity lower portion 162 (FIG. 7) is also connected to the atmosphere exteriorly of the valve L" through the air control exhaust passageway 170, which extends outwardly and upwardly and thence inwardly in the valve housing 140, as shown, and then up and out the plug passageway 171 to the atmosphere exteriorly of the valve L".

The valve body 154 also has an air control valve seat 174 defining an air control seat opening 176 disposed between and connecting the air control cavity lower portion 162 and the auxiliary pressurized air (when the diaphragm 158 is in its upper position as will be explained). The air control diaphragm 158 is mounted in the body 154 for controlled reciprocal movement toward and away from the air control valve seat 174 selectively sealing the same to control the flow of auxiliary pressurized air through the air control seat opening 176. The air control diaphragm 158 has an air control passageway 178 connecting the air control seat opening 176 with the air control cavity upper portion 160, whereby auxiliary pressurized air flows through the air control passageway 178 (from the passageways 166 and 168) and into the air control cavity upper portion 160 to equalize the pressurized air on both sides of the air control diaphragm 158. Air control bias means in the form of a compressed coil spring 180 (contained in the bore 182 and acting against the diaphragm 158) is used for retaining the air control diaphragm 158 in a normally closed position against the air control seat 174. Thus, the air control cavity lower portion 162 is in fluid flow communication with the auxiliary pressurized air (when the diaphragm 158 is lifted from the seat 174) and in fluid flow communication with the atmosphere exteriorly of the liquid level valve through the air control exhaust passageways 170 and 171.

The valve body 154 also has an actuating cavity 184 (FIG. 6) disposed above the air control cavity 156 and in fluid flow communication with the atmosphere exteriorly of the liquid level valve through the actuating exhaust passageway 185 (FIG. 7), which connects the actuating cavity 184 with the air control cavity lower portion 162 from which the pressurized air is exhausted through the passageways 170 and 171, as aforedescribed. Additionally, the valve body 154 has an actuating valve seat 186 defining an actuating passageway 187 of larger transverse size than the air control passageway 178 and is disposed between and connects the actuating cavity 184 and the air control cavity upper portion 160. The valve body 154 carries a vertically reciprocable intermediate diaphragm 173 which, in turn, carries a valve stem 177. The valve body 154 also has a bore 175 in which the valve stem 177 is reciprocably disposed. The stem 177 carries an actuating disc 188, said stem and disc being mounted in the bore 175 for vertical reciprocal movement toward and away from the actuating valve seat 186 selectively sealing the same to control the flow of pressurized air through the actuating passageway 187. The stem 177 and valve disc 188 are held against the seat 186 in normally closed position by actuating bias means in the form of the compressed coiled spring 179.

The valve housing 140 carries in suspended parallel relation a pair of coacting spaced actuating diaphragms 181 and 189 which are held together by the posts 183a, 183b, 183c (and a fourth post not shown) to form a dual or double diaphragm structure. This construction provides increased structural strength to withstand road vibrations. The diaphragm 181 and, in turn, the diaphragm 189, are responsive to atmospheric pressure within the liquid level valve and are mounted in the chamber 142 for vertical reciprocation exteriorly of the valve body 154 to coactively control the valve disc 188.

The valve stem 177 has a clip 190 disposed adjacent its upper end which extends laterally outward of the stem in opposite directions as shown in FIG. 7. The diaphragm 189 carries a cup or cup portion 191, the outer portions of which underlie the clip 190, such that as the diaphragm 189 rises a predetermined amount, its cup 191 carries the clip 190 and stem 177 upwardly to lift the disc 188 off the valve seat 186.

The actuating diaphragm 189 forms a horizontal fluid barrier dividing the chamber 142 into a chamber upper section 192 and a chamber lower section 193. The chamber upper section 192 is vented to the atmosphere exteriorly of the liquid level valve through the exhaust orifice 194.

In operation, as the level of liquid lading in the storage tank T rises around the valve housing 140, atmospheric air pressure within the chamber lower section 193 increases and acts against the underside of diaphragm 181 forcing the diaphragms 181 and 189 as a unit upward, thereby lifting the valve stem 177 and thence the actuating disc 188 off the actuating valve seat 186 in response to such increased interior atmospheric air pressure, thereby exhausting auxiliary pressurized air from the air control cavity upper portion 160. Such exhausting enables the auxiliary pressurized air to act against the underside of the air control diaphragm 158 only and lift the same off the air control seat 174 permitting the auxiliary pressurized air to enter the air control cavity lower portion 162 and thence flow to the atmosphere exteriorly of the liquid level valve L" to exhaust the auxiliary pressurized air and close the emergency valve B as aforedescribed.

Figure 10:
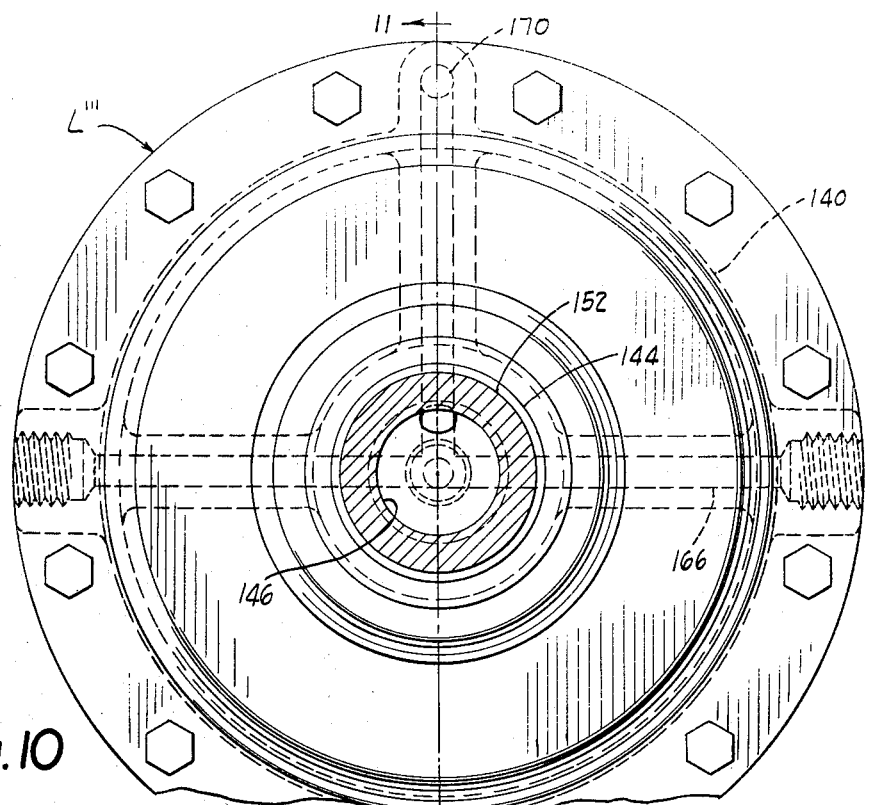
FIG. 10 is a view taken along the line 10—10 of FIG. 9, with portions broken away.
Figure 9:
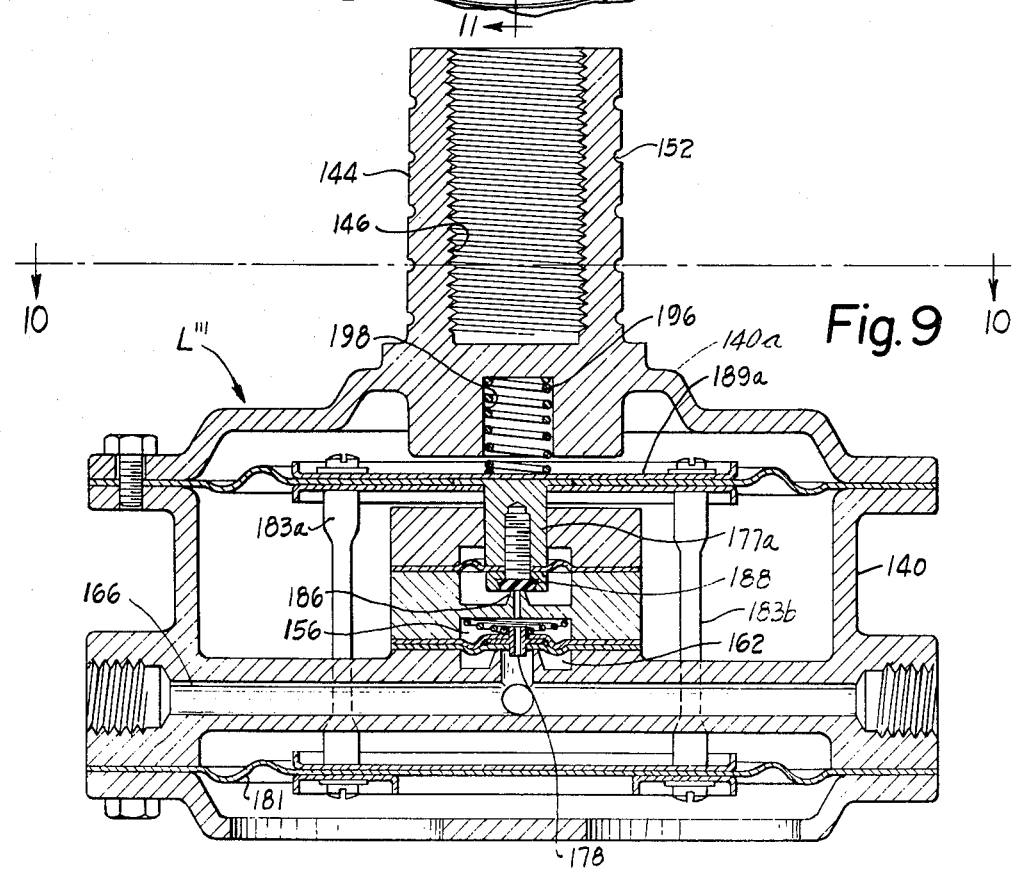
FIG. 9 is a view similar to FIG. 6, but showing a modification thereof.
Figure 11:
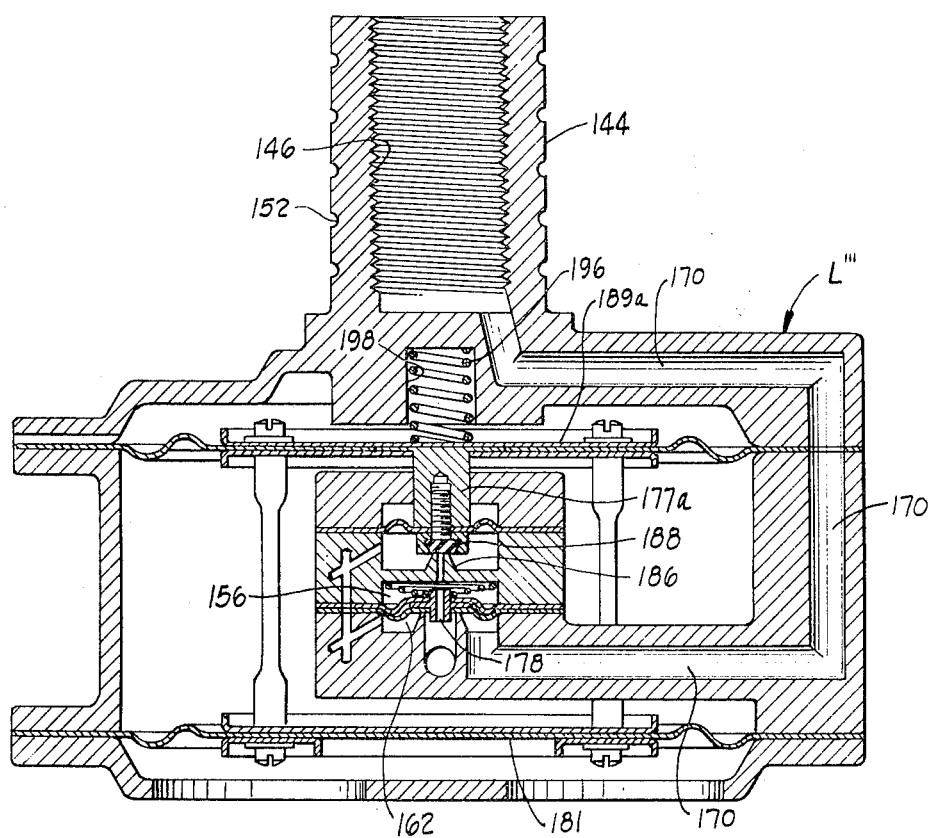
FIG. 11 is a view taken along the line 11—11 of FIG. 10.

Referring now to the valve L'" shown in FIGS. 9, 10 and 11, the modification shown therein incorporates the double diaphragm structure shown in FIGS. 6, 7 and 8, but with certain novel variations now to be described. As best shown in FIGS. 9 and 11, the valve stem 177a is secured directly to the upper actuating diaphragm structure 189a. Also, the upper diaphragm 189a and the valve stem 177a secured thereto are biased and maintained in a lower position by bias means in the form of a compressed coil spring 196 such that the disc 188 is maintained against the valve seat 186 in a normally closed position. The spring 196 is contained in the bore 198 and acts against the top surface of the diaphragm 189a. Thus, the compressed coil spring 196 is disposed between the diaphragm 189a and the top wall 140a of the housing 140. This construction effects a more stable structure that overcomes the harmful effects of vibration previously encountered by the vibrational pounding of the diaphragm 189a against the top wall of the valve housing, such vibrational pounding now being forestalled. In other respects, the valve L‴ is similar in structure and function to the valve L″ of FIGS. 6, 7 and 8.

Thus, the invention provides a liquid level valve for use in a liquid storage tank T having an emergency loading valve B held open by auxiliary pressurized air comprising air control means including, for example, the diaphragm 158 and seat 174 structure for reducing the auxiliary pressurized air to the emergency loading valve, and coacting actuating means including, for example, the disc 188 and seat 186 structure responsive to air pressure within the valve for actuating the air control means to reduce the auxiliary pressurized air and close the emergency loading valve B.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A liquid storage tank liquid lading loading system comprising, an emergency loading valve held open by an associated source of auxiliary pressurized air, a liquid level valve disposed in the interior of the tank and connected to said emergency loading valve and actuated in responsive to increased tank interior air pressure to discharge the auxiliary pressurized air and close the emergency valve, a distributor valve connected to the liquid level valve to distribute the auxiliary pressurized air thereto, and a master control valve connected to the distributor valve and connected to the associated source of pressurized air to control the flow of such pressurized air in the distributor valve, said master control valve being spring-loaded to closed position whereby only manual actuation thereof maintains the same in open position.

2. The structure of claim 1 and further including a remote control frangible plug having pressurized air tubing connected to said master control valve enabling manual fracture of the pressurized air tubing under emergency conditions.

3. The structure of claim 2 and further including heat sensitive fusible plugs operatively connected to the frangible plug and to the distributor valve to provide release of pressurized air at predetermined heat levels.

4. The structure of claim 1 wherein said liquid valve comprises, air control means for reducing the auxiliary pressurized air to the emergency loading valve, and coacting actuating means responsive to valve interior air pressure for actuating the air control means to reduce the auxiliary pressurized air and close the emergency loading valve.

* * * * *